United States Patent
Faraboschi et al.

(10) Patent No.: US 8,291,488 B2
(45) Date of Patent: Oct. 16, 2012

(54) REMOTE CONNECTION BETWEEN INTERMEDIARY DEVICE AND COMPUTING DEVICE VIA CENTRAL AUTHORITY SOFTWARE

(75) Inventors: Paolo Faraboschi, Barcelona (ES); Ayose Falcon, Barcelona (ES); Daniel Ortega, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 813 days.

(21) Appl. No.: 12/305,856

(22) PCT Filed: Jun. 26, 2007

(86) PCT No.: PCT/EP2007/056379
§ 371 (c)(1),
(2), (4) Date: May 5, 2009

(87) PCT Pub. No.: WO2008/000746
PCT Pub. Date: Jan. 3, 2008

(65) Prior Publication Data
US 2009/0282234 A1     Nov. 12, 2009

(30) Foreign Application Priority Data
Jun. 29, 2006   (GB) .................................. 0612818.5

(51) Int. Cl.
*H04L 29/06* (2006.01)
(52) U.S. Cl. .......... 726/15; 709/200; 709/201; 709/229; 709/238; 713/2
(58) Field of Classification Search ...... 713/2; 709/200, 709/201, 229, 238
See application file for complete search history.

(56) References Cited

U.S. PATENT DOCUMENTS

| | | | |
|---|---|---|---|
| 6,212,570 B1 * | 4/2001 | Hasebe et al. ................ | 709/238 |
| 6,671,729 B1 | 12/2003 | Gordon et al. | |
| 7,363,514 B1 * | 4/2008 | Behren ............................ | 713/2 |
| 2002/0065906 A1 | 5/2002 | Davidson et al. | |
| 2003/0217166 A1 * | 11/2003 | Dal Canto et al. ............ | 709/229 |
| 2004/0221009 A1 | 11/2004 | Cook et al. | |
| 2005/0022012 A1 * | 1/2005 | Bluestone et al. ............ | 713/201 |
| 2005/0228848 A1 * | 10/2005 | Thurston et al. ................ | 709/200 |
| 2006/0095499 A1 * | 5/2006 | Luciani et al. ................ | 709/201 |
| 2006/0112313 A1 * | 5/2006 | Tripp et al. ..................... | 714/36 |
| 2006/0123182 A1 | 6/2006 | Sandulescu et al. | |
| 2006/0143432 A1 * | 6/2006 | Rothman et al. ................ | 713/2 |

OTHER PUBLICATIONS

Yi-Neng, "VPN Gateways over Network Processor", Mar. 2005, IEEE, Proceedings of Real Time and Embedded Technology.*
Davoli, R. "VDE: Virtual Distribued Ethernet", Testbeds and Research Infrastructures for the Development of Networks and Communities, Feb. 23-25, 2005.

* cited by examiner

*Primary Examiner* — Taghi Arani
*Assistant Examiner* — Gregory Lane

(57) ABSTRACT

Upon an intermediary device on a network being turned on, controlling system software at the intermediary device is booted such that no public network address is ever assigned to the intermediary device. The intermediary device sends a boot message over the network to central authority software running on one or more first computing devices on the network. The central authority software in response sends messages over the network to the intermediary device and to a second computing device on the network to establish a private tunnel with one another. The intermediary device and the second computing device establish the private tunnel with one another over the network. The intermediary device then opens a remote connection to the second computing device through the private tunnel so that peripherals connected to the intermediary device as if they were directly connected to the second computing device.

20 Claims, 3 Drawing Sheets

FIG 3

REMOTE CONNECTION BETWEEN INTERMEDIARY DEVICE AND COMPUTING DEVICE VIA CENTRAL AUTHORITY SOFTWARE

BACKGROUND

In typical networked computing environments, each user is provided with a computing device located near the user and that is networked with the other computing devices and with server computing devices as well as peripheral devices. However, this approach is less than advantageous for hardware management purposes. In particular, when a computing device requires maintenance or repair, IT personnel have to physically visit the location of the computing device to perform the needed maintenance or repair.

Therefore, techniques have been increasingly employed in computing environments to overcome this problem. Such techniques centralize the computing devices of users within a single location that is more conveniently accessible by IT personnel. However, these prior art techniques can be difficult to employ in relation to an existing networked computing environment in which each user has his or her own computing device located near the user.

For example, remotization techniques that employ keyboard-video-mouse (KVM) devices to transfer such KVM traffic back and forth to the centralized computing devices may have distance limitations as to how far the KVM devices can be positioned relative to the computing devices. The KVM devices may also not work with certain types of peripheral devices, especially Universal Serial Bus (USB) devices. Furthermore, new cabling may be needed to connect the KVM devices to the centralized computing devices, increasing cost. All these configurations also require management of the connections to and from the user location, which increases cost.

For this and other reasons, therefore, there is a need for the present invention.

DETAILED DESCRIPTION OF THE DRAWINGS

Figure 1:
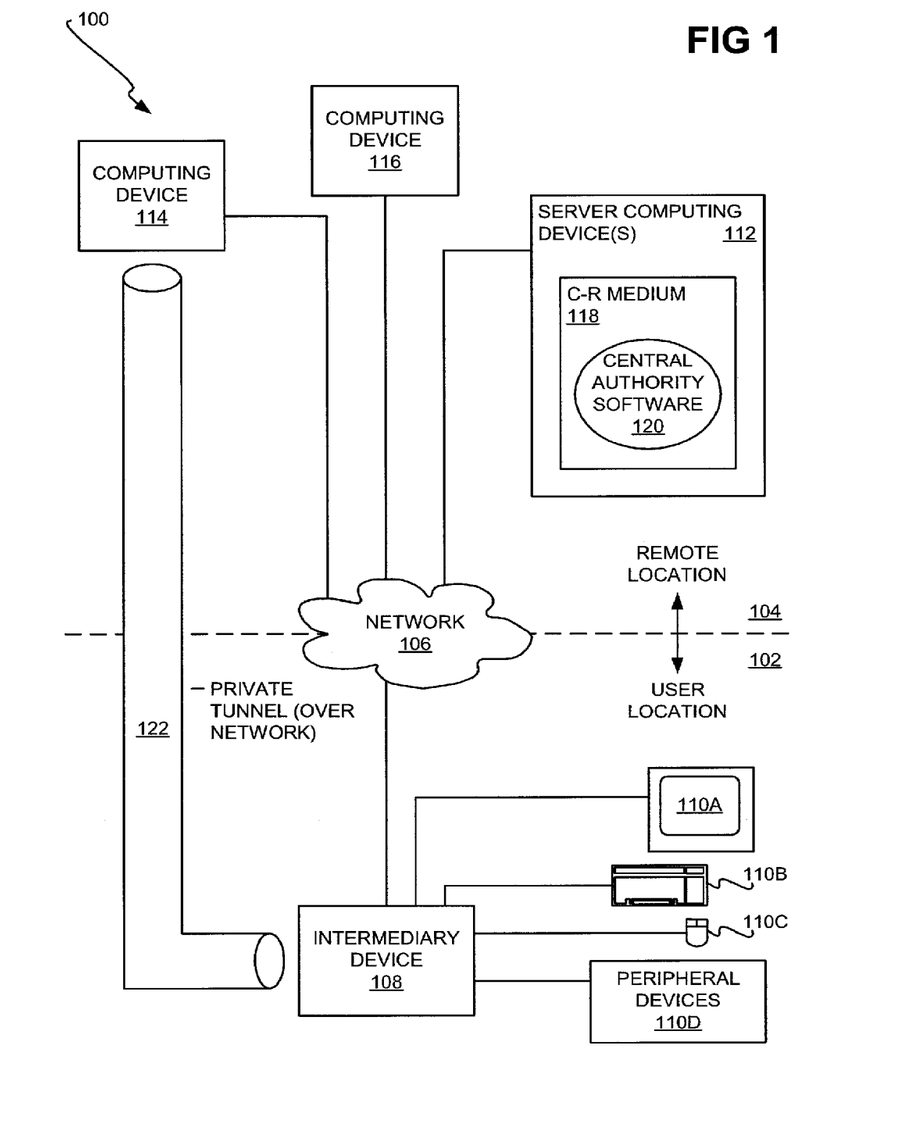
FIG. 1 is a diagram of a system, according to an embodiment of the invention.

FIG. 1 shows a system 100, according to an embodiment of the invention. Most components of the system 100 are located in one of two locations: a user location 102, or a remote location 104. The network 106 communicatively connects the components of the system 100 at the user location 102 with those at the remote location 104, and therefore is not considered to be only at one location.

The user location 102 is the location at which end users are located. At the user location 102 is an intermediary device 108. A number of different types of devices are connected to the intermediary device 108, including a display device 110A, a keyboard device 110B, a pointing device 110C, and one or more peripheral devices 110D. All of these devices are collectively referred to as the devices 110, and there may be more or less of the devices than is depicted in FIG. 1, of the same or different types. The peripheral devices 110D, as well as the keyboard device 110B and the pointing device 110C, may be Universal Serial Bus (USB) devices, for instance.

The user interacts directly with the devices 110 connected to the intermediary device 108. Thus, the user provides input on the keyboard device 110B and the pointing device 110C, and views visual output on the display device 110A. The user may also directly interact with the peripheral devices 110D. The intermediary device 108 may be a thin-client computing device, for instance, with no moving parts, a representative example of which is described later in the detailed description. Whereas one instance of an intermediary device 108 and associated devices 110 is depicted in FIG. 1 for illustrative convenience, in actuality there may be one such instance per each user, for example, or at least more than one instance of an intermediary device and associated devices.

The remote location 104 is desirably a centralized location that is relatively conveniently accessible to Information Technology (IT) personnel, and may be a secure location not readily accessible by the end users at the user location 102. As depicted in the example of FIG. 1, one or more server computing devices 112, and two computing devices 114 and 116 are located at the remote location 104. The computing devices 114 and 116 are the actual computing devices used by the end users remotely via intermediary devices at the user location 102. In the example of FIG. 1, the computing device 114 is particularly that with which the intermediary device 108 communicates, whereas the computing device 116 may be considered a spare computing device that is used if the computing device 114 malfunctions. The computing devices 112, 114, and 116 are connected to the network 106, and each have a public network address, such as an Internet Protocol (IP) address, which may be obtained using a conventional static or dynamic approach, as can be appreciated by those of ordinary skill within the art.

While only two computing devices 114 and 116 are depicted in the example of FIG. 1, in actuality there may be less or more of such computing devices 114 and 116. As suggested by FIG. 1, the computing devices 114 and 116 are each an actual physical instance of a computing device, having its own case or enclosure, and so on. In another embodiment, however, the computing devices 114 and 116 may be "blade" computing devices disposed within the same case or enclosure, and may indeed by installed within the server computing devices 112, or another server computing device. Furthermore, the computing devices 114 and 116 may alternatively be virtual computing devices running on the same set of hardware, as part of the server computing devices 112, or another server computing device.

An overview of the manner by which the system 100 of FIG. 1 is employed is now presented, where the details are presented in relation to a method subsequently described in the detailed description. The server computing devices 112 include a tangible compute-readable medium 118, such as a recordable data storage medium, volatile semiconductor memory, and so on, on which central authority software 120 resides. The software 120 may run on one of the server computing devices 112, or its execution may be distributed over a number of the server computing devices 112.

When the user turns on the intermediary device 108, the central authority software 120 instructs both the intermediary device 108 and the computing device 114 to establish a private tunnel 122 over the network 106 with one another. Thereafter, the intermediary device 108 opens a remote desktop connection with the computing device 114 through the tunnel 122. User interaction with the devices 110 is communicated between the computing device 114 and the intermediary device 108 through the tunnel 122 as well.

The central authority software 120 allows information technology (IT) personnel to manage the computing devices 114 and 116 remotely. For instance, if the computing device 114 develops a malfunction, the IT personnel can have the intermediary device 108 establish a private tunnel with the computing device 116 instead of the computing device 114. Thus, a visit to the user location 102 is not necessary (or can be scheduled more flexibly) to fix many types of problems that commonly develop within computing devices. The IT personnel may remain at the remote location 104, or, indeed, may be at a location other than the remote location 104 and the user location 102.

In one embodiment of the invention, the central authority software 120 can automatically connect the intermediary device 108 to the computing device 116 when the software 102 detects that the computing device 114 is malfunctioning. Such automatic connection is achieved without the intervention of IT personnel. The central authority software 120 may detect that the computing device 114 is malfunctioning by examining the state of the device 114 itself. Additionally, or alternatively, the software 120 may detect that the computing device 114 is malfunctioning by a user informing the software 120 of an anomalous situation.

Furthermore, the central authority software 120 allows a dividing of the devices 110 connected to the intermediary device 108 insofar as to which of the computing devices 114 and 116 the devices 110 are virtually connected. For instance, the intermediary device 108 may enable a user to log on and use the computing device 114 with respect to the devices 110A, 110B, and 110C, but another user may use one or more of the peripheral devices 110D in relation to another computing device, such as the computing device 116. In this respect, the system 100 provides for more flexibility in the division and assignment of peripheral devices among the computing devices.

As will become apparent later in the detailed description, the remotization and/or virtualization approach employed by at least some embodiments of the present invention differs from those within the prior art at least in one or more of the following ways. First, the intermediary device 108 is essentially invisible within the network 106. That is, it is not assigned a public network address on the network 106, such as a static or a dynamic IP address. As such, network administrators do not have to allocate new network addresses for such intermediary devices being added to the system 100. Rather, the intermediary device 108 is communicated with over the network 106 via a device-unique address, such as a Media Access Control (MAC) address, rather than with a public network address like an IP address.

Second, the intermediary device 108 is essentially transparent to the end user. The user may turn on the intermediary device 108, which alerts the central authority software 120 of this fact. The software 120 may then cause the computing device 114 to be turned on remotely, without interaction by the end user. User authentication may be provided only at the computing device 114, as opposed to at the computing device 114 and at the intermediary device 108, for instance. The presence of the intermediary device 108 thus does not affect the end user experience in any way except for the fact that the intermediary device 108 is located near the user instead of the computing device 114. When the user turns off the intermediary device 108, the central authority software 120 is alerted, and may itself remotely turn off the computing device 114, without end user interaction.

As compared to the prior art, at least some embodiments of the present invention are advantageous in that they do not require deployment of new hardware except for the relatively inexpensive intermediary devices, such as the device 108. Some of the existing computing devices, like the devices 114 and 116, could simply be moved from the end user location 102 to the remote location 104. By comparison, existing virtualization techniques in particular can require that all new computing devices be purchased to replace the computing devices. Virtualization is where multiple users have virtual computing devices assigned to them and that run on the same one or more server computing devices. As such, the existing computing devices of the users usually cannot be employed in virtualization.

Furthermore, as compared to prior art remotization techniques, at least some embodiments of the present invention are advantageous in that they do not have the same distance and cabling constraints. The existing networking cables that connect the computing devices at the user location 102 to the network 106 can be used when these computing devices are moved to the remote location 104 and substituted at the user location 102 with intermediary devices. This is because the intermediary device 108 establishes the private tunnel 122 with the computing device 114 over the network 106, such that communication over the private tunnel 122 is achieved over the network 106.

By comparison, prior art remotization techniques, such as keyboard-video-mouse (KVM) techniques, typically do not achieve communication between the KVM hardware and the remote computing device over a network. Existing network cables may be employed between the KVM hardware and the remote computing device, but there may be distance limitations that are not present with typical network communication. Furthermore, a direct connection between the KVM hardware and the remote computing device may be required, as opposed to typical network communication which can be achieved via hubs, switches, routers, and so on. In some instances, completely new networking cables may have to be run, such as CAT6 cabling instead of the more common CAT5 and CAT5e cabling found in legacy environments.

Finally, as compared to prior art techniques, at least some embodiments of the present invention are advantageous in that they allow for utilization of nearly any peripheral devices at the intermediary device 108. USB peripheral devices in particular have their communication sent over a USB/IP connection through the private tunnel 122 over the network 106. The intermediary device 108 does not have to have any knowledge of specific details of the USB peripheral devices themselves, which is advantageous where the intermediary device 108 runs an operating system or other software that does not in actuality support these devices.

Rather, the intermediary device 108 simply conveys low-level USB communication at the Host Controller Interface (HCI) level through the private tunnel 122 to the computing device 114. Low-level USB communication at the HCI level means that just simple sequences of data read and write operations are conveyed through the private tunnel 122. Application programs running on the computing device 114 therefore have no knowledge that these peripheral devices are not directly connected to the computing device 114, and instead are actually directly connected to the intermediary device 108. For legacy serial or parallel devices, readily available and inexpensive serial-to-USB and parallel-to-USB conversion devices can be employed within embodiments of the present invention.

By comparison, prior art techniques often have difficulty with supporting USB peripheral devices in particular. Where a thin client computing device is used at the user location 102, prior art techniques can require that this thin client device itself support the USB peripheral devices, which is problematic where the thin client device runs an operating system or other software for which there are no drivers for the USB peripheral devices in question. KVM solutions also usually do not support peripheral devices besides keyboards, display devices, and pointing devices, which means that environments in which other types of devices have to be accessed by end users are not as suitable for KVM approaches to remotization.

Figure 2:
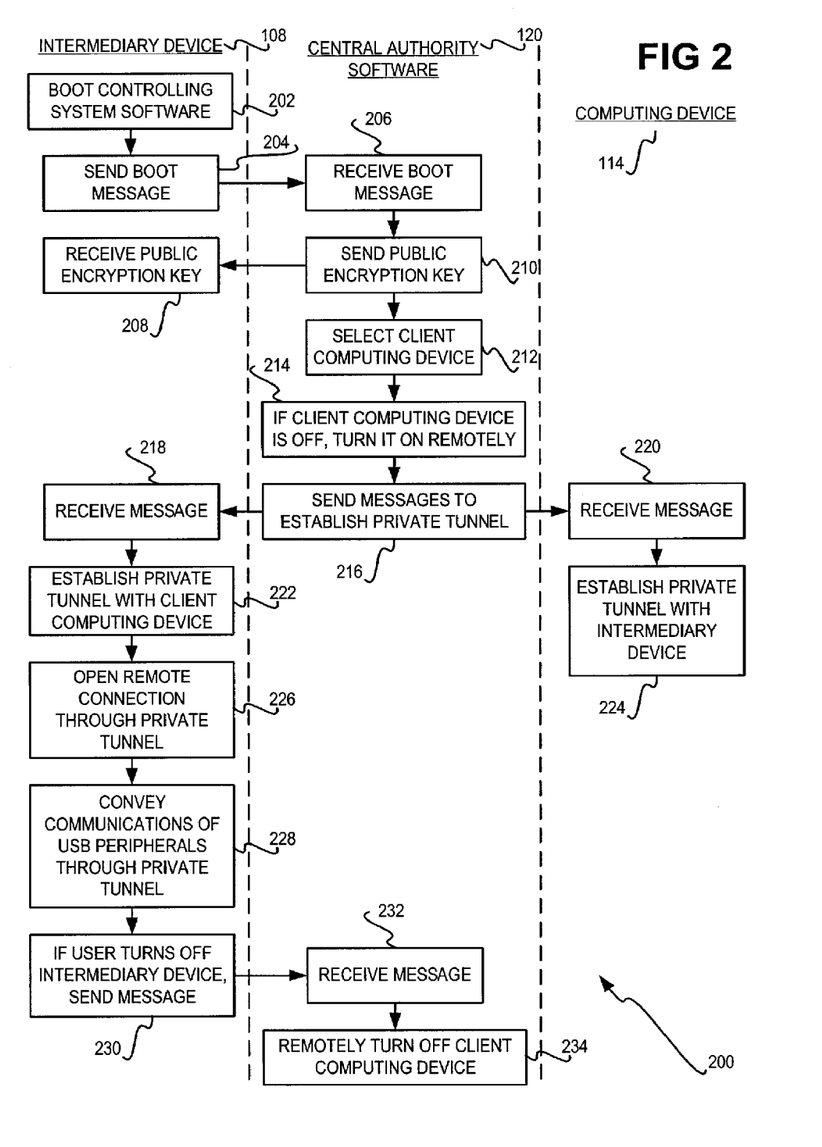
FIG. 2 is a flowchart of a method, according to an embodiment of the invention.

FIG. 2 shows a method 200 for realizing a remote connection between the intermediary device 108 and the computing device 114 via the central authority software 120 and that realizes the advantages that have been described, according to an embodiment of the invention. FIG. 2 is divided into three columns, indicating which parts of the method 200 are performed by the intermediary device 108, which parts are performed by the central authority software 120, and which parts are performed by the computing device 114. The intermediary device 108, the central authority software 120, and the computing device 114 communicate over the network 106 in performing the method 200.

The method 200 is performed upon the intermediary device 108 being turned on by the end user. For instance, the end user may press a power button on the intermediary device 108. The intermediary device 108 then boots the controlling system software (202) that is stored on the device 108. The controlling system software may be operating system software, such as a version of the LINUX® operation system, or a version of the Microsoft Windows® operating system, available from Microsoft Corp., of Redmond, Wash. The controlling system software allows the intermediary device 108 to communicate over the network 106, but the intermediary device 108 does not ever have assigned to it a public network address. The controlling system software can in one embodiment be considered as that which performs the parts of the method 200 ascribed to the intermediary device 108.

A public network address as used herein is a network address that identifies a resource on the network 106 in a public manner in accordance with a predetermined network protocol such that other resources on the network 106 are able to send data to and receive data from the resource via the predetermined network protocol using this network address. An example of such a public network address is an IP address, which is used to identify resources on the network 106 so that they are able to communicate data in accordance with the Transmission Control Protocol (TCP)/IP network protocol. IP addresses are typically in the form of a.b.c.d, where each of a, b, c, and d is an integer between 0 and 255.

IP addresses are typically assigned in a dynamic or a static manner. Dynamic IP address assignment usually means that a resource upon locating the network 106 sends a request over the network 106 to receive an IP address. In response, a server, such as a Dynamic Host Configuration Protocol (DHCP) server, provides the resource with a network address that is currently not being used by any other resource on the network. Such dynamic IP addresses are leased to resources, such that the resources have to renew their addresses, or request new ones, based on the period of the lease.

By comparison, static IP address assignment usually means that a resource is manually assigned a resource during configuration of the resource by a user, such as IT personnel. The user has to take care that the static IP address assigned will be unique as compared to other IP addresses that other resources may have. Because the intermediary device 108 is not ever assigned such a public network address dynamically or statically, IT personnel thus do not have to ensure that there are sufficient numbers of these network addresses available when adding the intermediary device 108 to the network 106. That is, with respect to the network protocol that utilizes these network addresses, the intermediary device 108 is effectively invisible.

The terminology public network address is further public in a way that may be different than the term public is usually employed. For example, all of the resources on the network 106 (except the intermediary device 108) may share the same IP address insofar as communication over or with the Internet is concerned, where the network 106 is a local-area network (LAN), and network-address translation (NAT) or another approach is employed to allow such sharing. In such instance, conventionally the IP address that identifies these resources on the Internet is referred to as a public IP address. The resources may also have private IP addresses that identify them individually on just the network 106 to other resources also on the network 106.

By comparison, the terminology public network address as used herein is inclusive of and encompasses such utilization of private IP addresses. That is, the private IP addresses that may be assigned to all the resources on the network 106 (except the intermediary device 108) to identify themselves to the other resources on the network 106 are considered public network addresses insofar as embodiments of the invention are concerned. Such private IP addresses are considered public network addresses herein because they publicly identify the resources to other resources, even if these resources are on the same network 106. By comparison, the terminology private IP addresses and public IP addresses is conventionally used to distinguish IP addresses used on a smaller network (such as a LAN) as compared addresses used on the Internet itself.

Therefore, that the intermediary device 108 is not ever assigned a public network address means that it is not ever assigned a network address that identifies the device 108 to other resources on the network 106 insofar as a particular network protocol is concerned. For example, the intermediary device 108 is never dynamically or statically assigned a private or a public IP address as to the network 106. As such, the intermediary device 108 is essentially invisible to the other resources on the network 106, insofar as the TCP/IP network protocol is concerned.

The intermediary device 108 upon booting sends a boot message to the central authority software 120 (204). The boot message may be considered a public broadcast message that is sent on the network 106 by the intermediary device 108. Because the intermediary device 108 does not have a public network address, such as a public IP address, it uses a protocol other than the network protocol that utilizes these network addresses, such as the TCP/IP protocol or the IP protocol. For instance, the intermediary device 108 may use a lower-level (i.e., different) protocol than TCP/IP, in which the device 108 identifies itself via a device-unique address of the intermediary device 108.

One example of a device-unique address is a Media Access Control (MAC) address, of the form aa:bb:cc:dd:ee:ff, where each of aa, bb, cc, dd, ee, and ff is a hexadecimal number between 00 and FF. MAC addresses are also known to those of ordinary skill within the art as "Ethernet" addresses, but are different from IP addresses. As is conventional, every piece of hardware intended to directly communicate over a network is assigned a unique MAC address. The device-unique address is not considered a public network address as used herein, however, because the device-unique address does not enable the intermediary device 108 to communicate in the same manner as devices having network addresses. For instance, communication using a MAC address is achieved using a network protocol that is lower or more fundamental (and thus different) than the TCP/IP protocol.

The central authority software 120 receives the boot message over the network 106 (206). The boot message from the intermediary device 108 includes the device-unique address of the device 108. In response, the central authority software 120 may first send the intermediary device 108 a public encryption key of the software 120 over the network 106 (210), and the intermediary device 108 receives this public encryption key (208). The software 120 sends the public encryption key to the intermediary device 108 by using the device-unique address of the device 108, since the device 108 does not have a public network address. The intermediary device 108 may install the public encryption key internally as a Secure SHell (SSH) certificate.

The public encryption key of the central authority software 120 may be employed by the intermediary device 108 to encrypt all communications with the central authority software 120. Furthermore, the public encryption key ensures that only the software 120, and not any rogue software, will be able to control the intermediary device 108. Any management requests sent by the central authority software 120 to the intermediary device 108 are checked against the public encryption key, to ensure that it is in fact the central authority software 120 that originated such requests. As such, security of the system 100 of FIG. 1 is ensured insofar as the addition of the intermediary device 108 into the system 100 is concerned.

The central authority software 120 then selects to which computing device the intermediary device 108 will connect (212). For example, the software 120 may store a database of intermediary devices to computing devices to determine which computing device the intermediary device 108 in particular will connect. For example purposes only, it is presumed that the central authority software 120 selects the computing device 114. The same computing device may always be selected for the same intermediary device, or the next available computing device may be selected for a given intermediary device. Other approaches may further be employed to select computing devices for intermediary devices.

The central authority software 120 may verify that the computing device 114 that has been selected is turned on. If it is turned off, the central authority software 120 may thus turn on the computing device 114 remotely (214). For instance, "wake-on-LAN" capability of the computing device 114 may be leveraged, so that the software 120 can send a special message to the computing device 114 over the network 106 to boot the computing device 114. After waking the computing device 114, the central authority software 120 may wait before sending the messages in part 216 of the method 200, or otherwise stall the intermediary device 108, until the computing device 114 has booted and is ready to accept a remote connection from the intermediary device 108.

Thereafter, the central authority software 120 sends messages over the network 106 to the intermediary device 108 and the computing device 114 instructing them to establish a private tunnel 122 with one another (216). The intermediary device 108 receives its message (218), and the computing device 114 receives its message (220). The message may be sent to the intermediary device 108 using a network protocol that allows for the device 108 to have just a device-unique address, such as a MAC address, and not a public network address, such as an IP address. By comparison, the message may be sent to the computing device 114 using the public IP address thereof by which the computing device 114 is known within in the network 106.

The intermediary device 108 and the computing device 114 then establish a private tunnel 122 with one another over the network 106 (222, 224). The private tunnel 122 is a point-to-point communication tunnel so that the devices 108 and 114 can communicate with one another in a secure manner. The private tunnel 122 may be considered a Virtual Private Network (VPN) between the devices 108 and 114, for instance. The private tunnel 122 may be comparable to an IP security (Ipsec) tunnel, a Layer 2 Tunneling Protocol (L2TP) tunnel, or a Point-to-Point Tunneling Protocol PPTP (PPTP) tunnel. However, the private tunnel 122 is different than typical VPN tunnels in that the intermediary device 108 does not have a public network address, such as an IP address, but just a device-unique address, such as a MAC address. Therefore, the private tunnel 122 is established with a quasi-custom tunneling protocol that takes this fact into account.

It is noted, however, that the software running on the intermediary device 108, as well as the software running on the computing device 114, such as application programs, may be geared towards communication in a TCP/IP network protocol manner, and thus require a destination and/or a source network (i.e., IP) address to function properly. In such embodiments, each of the intermediary device 108 and the computing device 114 may assign itself an internal private network address for device-internal and/or tunnel-internal use only by such software. Because these network addresses are specific only to an intermediary device-computing device pair, they may be reused for each such intermediary device-computing device pair. For example, the private IP addresses 10.0.0.1 and 10.0.0.2 may be reused for each such pair. Thus, the private IP network addresses are guaranteed unique only as to the devices 108 and 114 at either end of the private tunnel 122.

In this way, software that runs on the devices 108 and 114 that requires communication using network addresses, such as IP addresses, is still able to function, because of the internally used private network addresses. It is noted that the terminology private network address is used herein differently than is conventional. For instance, conventionally, a private IP address may connotate an IP address that identifies a resource on a limited network, such as a LAN, but that otherwise does not identify the resource over a broader network, such as the Internet, as has been described. By comparison, a private network address, such as a private IP address, in the context here means that the devices 108 and 114 assign themselves private IP addresses for utilization within the scope of the private tunnel 122 only, for the benefit of any software requiring such network addresses that are running on the devices 108 and 114.

Therefore, it is still correctly said that the intermediary device 108 does not have a public network address, even a private network address as that terminology is conventionally understood, on the network 106. Rather, the private network address assigned to the intermediary device 108 is used only in the context of the private tunnel 122 between the device 108 and the computing device 114, for use by, for instance, application programs running on the devices 108 and 114. This private network address is not comparable to a private IP address as may be employed in NAT and other networking approaches within the prior art.

Once the private tunnel 122 between the intermediary device 108 and the computing device 114 has been established over the network 106, the intermediary device 108 can then open a remote connection to the computing device 114 through the private tunnel 122 (226). Where the computing device 114 is running a version of the Microsoft Windows® operating system, for instance, this remote connection may be a Remote Desktop Protocol (RDP) connection. Other types of remote connections are also amenable to implementation in relation to embodiments of the invention, such as, the Virtual Network Computing (VNC) protocol described at the Internet web site www.realvnc.com, and the Citrix protocol described at www.citrix.com. The remote connection allows a user at the intermediary device 108 to interact with the computing device 114 as if he or she were directly working on the device 114.

User authentication within the system 100 of FIG. 1 may be achieved only by virtue of this remote connection. That is, the user may not in one embodiment have to authenticate him or herself at the intermediary device 108 at all. Rather, once the remote connection from the intermediary device 108 to the computing device 114 has been opened through the private tunnel 122 over the network 106, the user authenticates him or herself as if he or she were directly working on the device 114. In this way, the intermediary device 108 is largely invisible to the user insofar as the user experience is concerned. The user does not have to be assigned a new user name and/or password, and does not have to logon to both the intermediary device 108 and the computing device 114. Rather, the user only has to logon to the computing device 114, no different than if the intermediary device 108 were not present.

The remote connection to the computing device 114 enables the devices 110 connected to the intermediary device 108 to be used in relation to the computing device 114. As such, communications of USB peripherals in particular are conveyed through the private tunnel 122 (228). Such back-and-forth communications from USB peripherals are achieved over a USB/IP connection. When a USB device communicates, the intermediary device 108 receives this communication, and sends it over the private tunnel 122 to the computing device 114. This transmission may use the private network addresses of the devices 108 and 114, and where these addresses are private IP addresses, the connection is referred to as a USB/IP connection.

The computing device 114 receives the USB device communications, and a virtual USB HCI software installed at the device 114 enables application programs and other software to access the communications and hence the USB device in question. Likewise, when an application program or other software at the computing device 114 wishes to send communications to a USB device connected to the intermediary device 108, the virtual USB HCI software installed at the device 114 sends the communications via the USB/IP connection to the intermediary device 108. The intermediary device 108 then transmits the communications to the appropriate USB device. Likewise, the USB device connected to the intermediary device 108 can autonomously initiate communication to the device 114 using the same approach that has been described.

This approach of virtualized USB devices insofar as the computing device 114 is concerned is advantageous in a number of respects. First, the intermediary device 108 does not need to have any driver specific to any of the USB devices that may be connected thereto. This is desirable, because the intermediary device 108 may run a different operating system than the computing device 114, and the driver software for a given USB device may be available only for the operating system running on the device 114, and not for the operating system running on the device 108. For instance, some USB devices may only have driver software available for specific versions of the Microsoft Windows® operating system, and not for versions of the LINUX® operating system. Thus, the intermediary device 108 does not need to have any knowledge of the specific details of the USB devices themselves, but simply transmits communications to and from such devices in relation to the private tunnel 122 for the computing device 114.

Second, the application programs and other software running on the computing device 114 do not have any knowledge that the USB devices are not directly connected to the computing device 114 itself. The virtual USB HCI is used instead of an actual USB HCI for physical (actual) USB ports of the device 114. The USB device driver software is installed on the computing device 114 no different than if the USB device were connected directly to the device 114. The USB device driver software indeed itself does not have knowledge that its corresponding USB device is not directly connected to the computing device 114 itself, because it interacts with the virtual USB HCI no different than with an actual USB HCI for physical USB ports. Therefore, insofar as the virtual USB HCI mimics or virtualizes an actual USB HCI, the USB device driver software requires no modification. As such, USB devices connected to the intermediary device 108 are used by the computing device 114 no different than if they were directly connected to the device 114.

At some point, the user of the intermediary device 108 may log off the computing device 114 via the remote connection through the private tunnel 122, and ultimately turn off the intermediary device 108 (230). For instance, the user may press the power button on the intermediary device 108. In response, the intermediary device 108 logs the user off the computing device 114, and sends an appropriate message to the central authority software 120, which receives the message (232). According to a policy established by the system administrator or other IT personnel, the software 120 may then turn off the computing device 114 remotely (234). If the user was not logged off the computing device 114 already, the software 120 may first log the user off the device 114 prior to turning it off remotely. The private tunnel 122 between the devices 108 and 114 is thus deleted.

Figure 3:
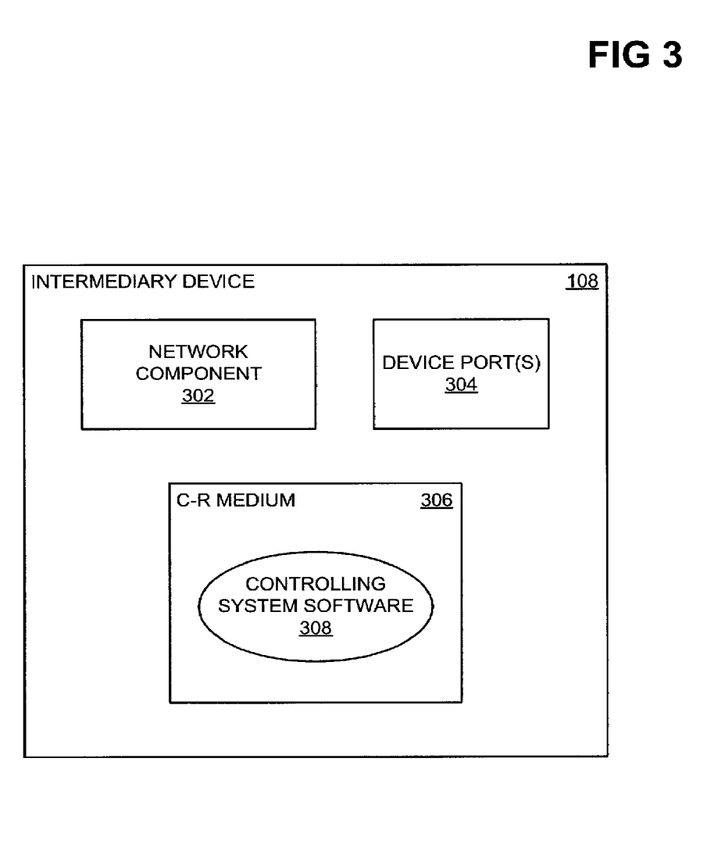
FIG. 3 is a rudimentary diagram of an intermediary device, according to an embodiment of the invention.

FIG. 3 shows a rudimentary diagram of the intermediary device 108, according to an embodiment of the invention. The device 108 is depicted in FIG. 3 as including a network component 302, one or more device ports 304, and a computer-readable medium 306. As can be appreciated by those of ordinary skill within the art, the device 108 may include other components, in addition to and/or in lieu of those depicted in FIG. 3. For instance, the device 108 typically will have one or more processors, as well as volatile semiconductor memory. In one embodiment, the device 108 may be a thin-client computing device, having a minimum amount of hardware processing power needed to perform its functionality. The device 108 may not have any moving parts, such as no hard disk drives, in one embodiment.

The network component 302 is that which enables the intermediary device 108 to communicate over the network 106. As has been described, the intermediary device 108 is never assigned a public network address, such as a public IP address, to identify the device 108. Rather, the device 108 itself, or the component 302, has a device-unique address, such as a MAC address, by which communication is achieved.

The ports 304 enable the devices 110 to be connected directly to the intermediary device 108. In one embodiment, the ports 304 include a display device port, such as a Video Graphics Array (VGA) port or a Digital Visual Interface (DVI) port, to provide for the display device 110A connecting to the intermediary device 108. In one embodiment, the ports 304 also include a number of USB ports, to which the keyboard device 110B, the pointing device 110C, and the other peripheral devices 110D are connected. Where keyboards and pointing devices have other types of interfaces, such as PS/2 connectors, instead of USB connectors, simple PS/2-to-USB converters can be employed. Likewise, where peripherals have other types of interfaces, such as serial ports, instead of USB connectors, relatively inexpensive serial-to-USB converters can be employed.

The computer-readable medium 306 may be hard disk drive, or another type of non-volatile storage. For instance, where the intermediary device 108 does not have any moving parts, the medium 306 may be non-volatile semiconductor memory, such as flash memory. The computer-readable medium 306 stores the controlling system software 308 thereon that performs the functionality ascribed to the intermediary device 108 in the method 200 of FIG. 2 that has been described. As such, the software sends a boot message over the network 106 to the central authority software 120, establishes a private tunnel 122 over the network 106 with the computing device 114, and so on.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A method comprising:
upon an intermediary device on a network being turned on, booting controlling system software at the intermediary device such that no public network address is ever assigned to the intermediary device;
the intermediary device sending a boot message over the network to central authority software running on one or more first computing devices on the network;
the central authority software in response sending messages over the network to the intermediary device and to a second computing device on the network to establish a private tunnel with one another;
the intermediary device and the second computing device establishing the private tunnel with one another over the network;
the intermediary device opening a remote connection to the second computing device through the private tunnel so that peripherals connected to the intermediary device can be used as if the peripherals were directly connected to the second computing device; and
the intermediary device conveying communications back and forth from the peripherals over a connection through the private tunnel to a virtual controller interface of the second computing device, such that the intermediary device has no knowledge of specific details of the peripherals themselves, and application programs running on the second computing device and that access the peripherals have no knowledge that the peripherals are not directly connected to the second computing device,
wherein the intermediary device, the one or more first computing devices, and the second computing device are hardware devices.

2. The method of claim 1, wherein booting the controlling system software at the intermediary device such that no public network address is ever assigned to the intermediary device comprises booting the controlling system software at the intermediary device such that no public dynamic or static Internet Protocol (IP) address is ever assigned to the intermediary device.

3. The method of claim 1, wherein the intermediary device sending the boot message over the network to the central authority software comprises the intermediary device using a device-unique address of the intermediary device to communicate over the network without a public network address and including the device-unique address within the boot message.

4. The method of claim 3, wherein the device-unique address of the intermediary device is an Ethernet Media Access Control (MAC) address.

5. The method of claim 1, wherein the central authority software sending a message over the network to the intermediary device to establish the private tunnel with the second computing device comprises the central authority software sending to the intermediary device over the network a public encryption key of the central authority software by which subsequent communication between the central authority software and the intermediary device is encrypted.

6. The method of claim 1, wherein the central authority software sending a message over the network to the intermediary device to establish the private tunnel with the second computing device comprises the central authority software sending the message to the intermediary device using a device-unique address of the intermediary device to communicate with the intermediary device over the network without the intermediary device having a public network address.

7. The method of claim 1, wherein the intermediary device and the second computing device establishing the private tunnel with one another comprises each device of the intermediary device and the second computing device assigning itself a private network address for device-internal use by application programs running on the device to communicate through the private tunnel in a network address manner.

8. The method of claim 7, wherein the private network address is an Internet Protocol (IP) address that is guaranteed unique only as to the intermediary device and the second computing device.

9. The method of claim 1, wherein the intermediary device opening the remote connection to the second computing device through the private tunnel is further so that user authentication occurs at the second computing device, such that no user authentication occurs at the intermediary device itself.

10. The method of claim 1, further comprising, where the second computing device is initially turned off, the central authority software remotely turning on the second computing device and waiting until the remote connection to the second computing device is openable before sending the messages over the network to the intermediary device and to the second computing device to establish the private tunnel with one another.

11. The method of claim 1, wherein the peripherals are Universal Serial Bus (USB) peripherals, the connection is a USB/Internet Protocol (IP) connection, and the virtual controller interface is a virtual Host Controller Interface (HCI).

12. The method of claim 1, wherein the central authority software is to automatically connect the intermediary device to a third computing device upon the central authority software detecting that the second computing device is malfunctioning.

13. An apparatus comprising:
a network component to communicate with one or more first computing devices and with a second computing device over a network using a device-unique address and without ever using or being assigned a public network address, the network component being a hardware network component;

one or more ports to which peripherals are correspondingly connectable, the one or more ports being one or more hardware ports; and a non-transitory computer-readable medium to store controlling system software to send a boot message over the network to central authority software running on the first computing devices, to establish a private tunnel over the network with the second computing device, and to open a remote connection to the second computing device through the private tunnel so that the peripherals can be used in relation to the second computing device, wherein the controlling system software is further to convey communications back-and-forth from the peripherals over a connection through the private tunnel to a virtual controller interface of the second computing device, such that controlling system software has no knowledge of specific details of the peripherals themselves, and application programs running on the second computing device and that access the peripherals have no knowledge that the peripherals are not directly connected to the second computing device.

14. The apparatus of claim 13, wherein the controlling system software in establishing the private tunnel with the second computing device is to assign itself a private network address for apparatus-internal use by application programs running on the apparatus to communicate through the private tunnel in a network address manner.

15. The apparatus of claim 13, wherein the controlling system software in opening the remote connection to the second computing device through the private tunnel is further so that user authentication occurs at the second computing device, such that no user authentication occurs at the apparatus itself.

16. The apparatus of claim 13, wherein the peripherals are Universal Serial Bus (USB) peripherals, the connection is a USB/Internet Protocol (IP) connection, and the virtual controller interface is a virtual Host Controller Interface (HCI).

17. A non-transitory computer-readable medium having central authority software stored thereon and executable by one or more first computing devices on a network to perform a method comprising:

receiving a boot message from an intermediary device on the network indicating that the intermediary device has been turned on, the boot message including a device-unique address of the intermediary device such that the boot message is received without the intermediary device having ever been assigned a public network address; and in response to receiving the boot message, sending messages over the network to the intermediary device and to a second computing device on the network to establish a private tunnel with one another using a private network address at each of the intermediary device and the second computing device for device-internal use by application programs running on the device to communicate through the private tunnel in a network address manner, wherein the intermediary device and the second computing device establish the private tunnel with one another over the network, wherein the intermediary device opens a remote connection to the second computing device through the private tunnel so that the peripherals connected to the intermediary device can be used as if the peripherals were directly connected to the second computing device, wherein the intermediary device conveys communications back and forth from the peripherals over a connection through the private tunnel to a virtual controller interface of the second computing device, such that the intermediary device has no knowledge of specific details of the peripherals themselves, and the application programs running on the second computing device and that access the peripherals have no knowledge that the peripherals are not directly connected to the second computing device, and wherein the intermediary device, the one or more first computing devices, and the second computing device are hardware devices.

18. The non-transitory computer-readable medium of claim 17, further comprising sending over the network to the intermediary device a public encryption key of the central authority software by which subsequent communication between the central authority software and the intermediary device is encrypted.

19. The non-transitory computer-readable medium of claim 17, wherein sending a message over the network to the intermediary device to establish the private tunnel with the second computing device comprises sending the message to the intermediary device using a device-unique address of the intermediary device to communication with the intermediary device over the network without the intermediary device having a public network address.

20. The non-transitory computer-readable medium of claim 17, further comprising:

where the second computing device is initially turned off, remotely turning on the second computing device and waiting until the remote connection to the second computing device is openable before sending the messages over the network to the intermediary device and to the second computing device to establish the private tunnel with one another; and, in response to receiving a message from the intermediary device indicating that the intermediary device is being turned off, remotely turning off the second computing device.

* * * * *